Figure 1:
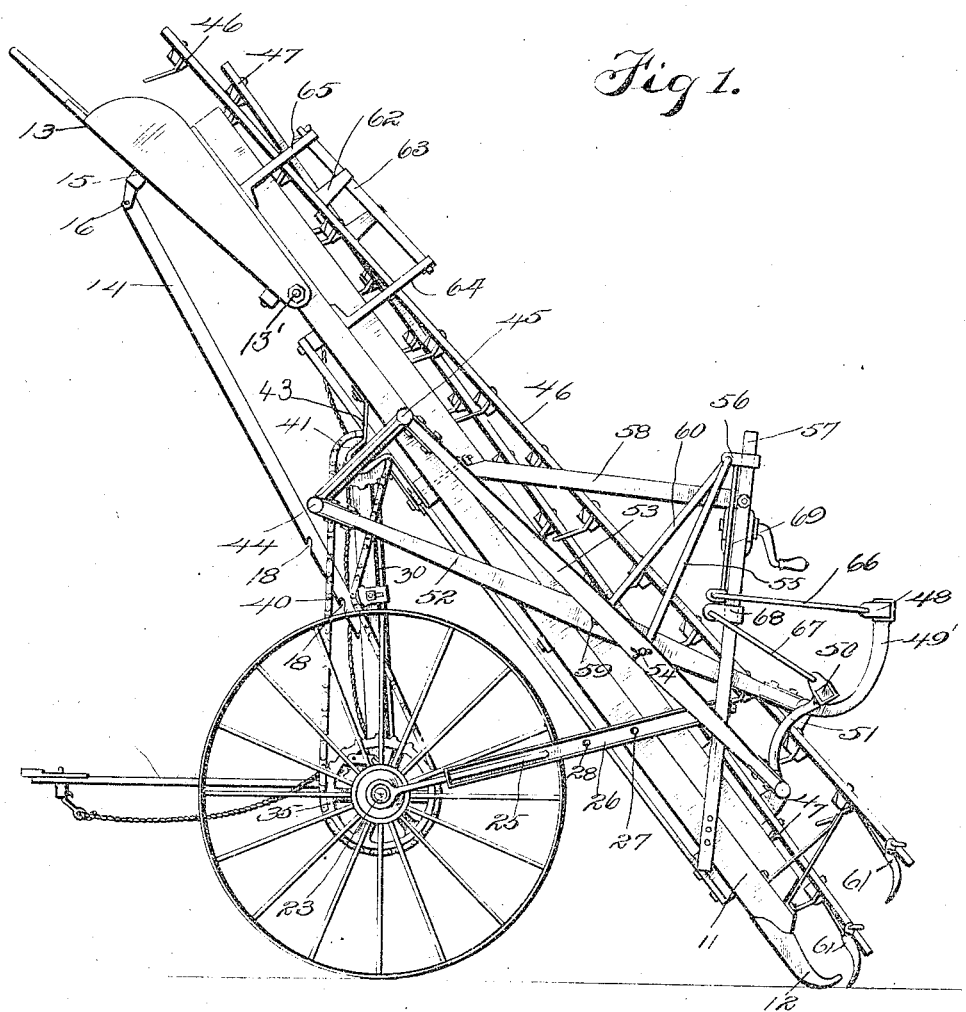

J. DAIN.
HAY LOADER.
APPLICATION FILED JUNE 21, 1902.

961,757.

Patented June 21, 1910.
6 SHEETS—SHEET 1.

Witnesses
J B Weir

Inventor
Joseph Dain
by Bond Adams Pickard Jackson
his Attys

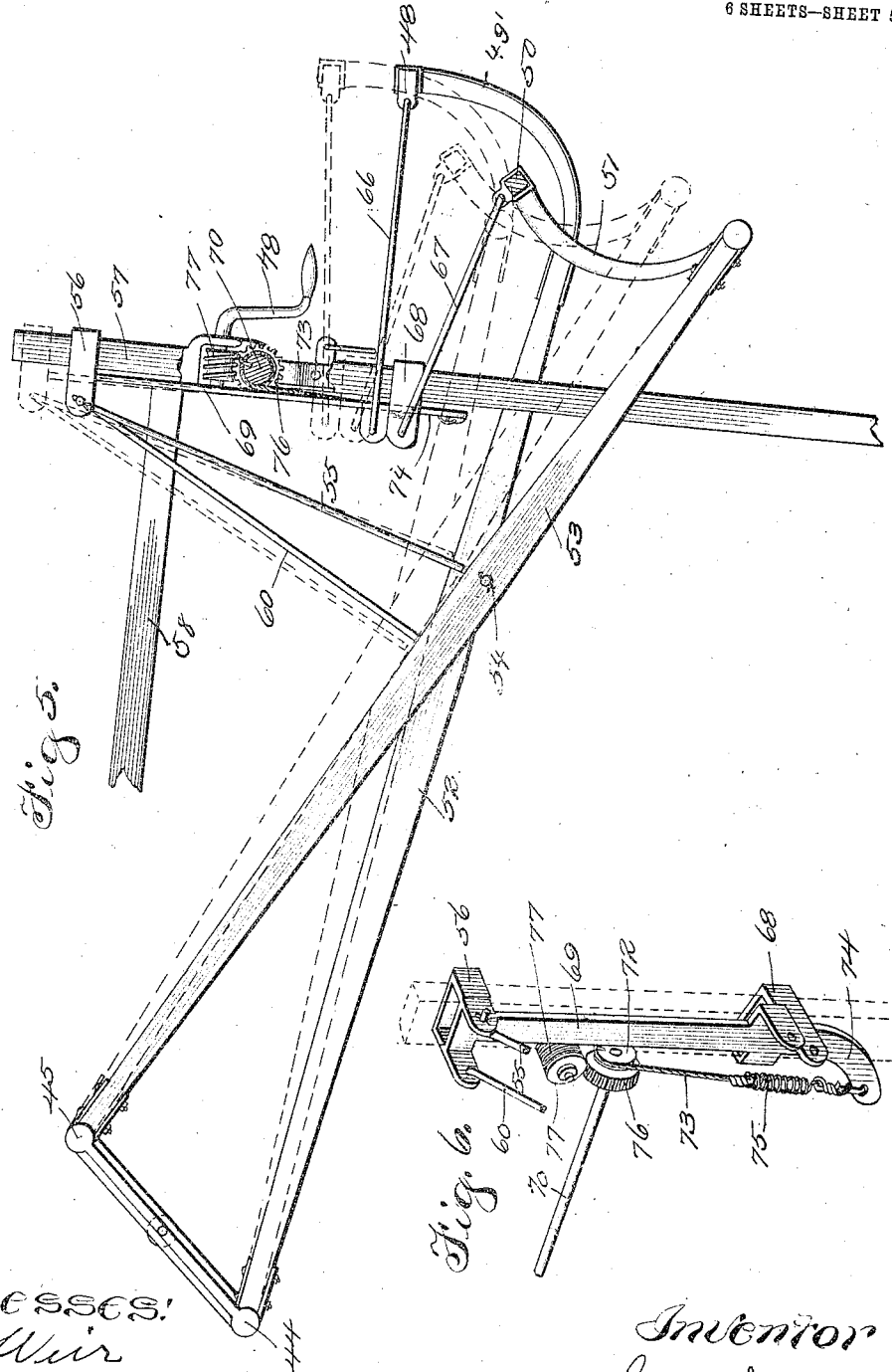

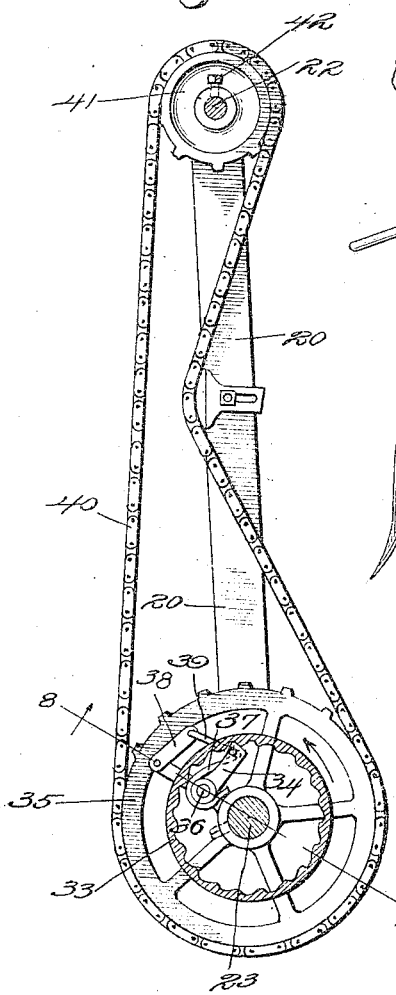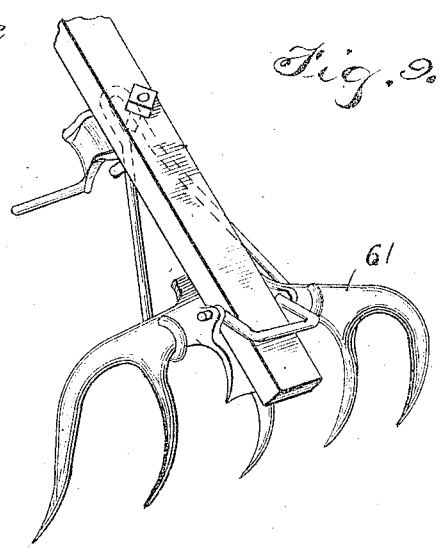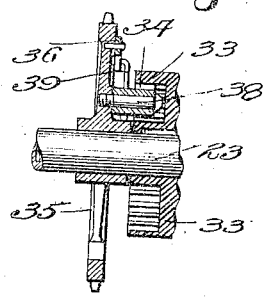

UNITED STATES PATENT OFFICE.

JOSEPH DAIN, OF OTTUMWA, IOWA.

HAY-LOADER.

961,757.

Specification of Letters Patent. Patented June 21, 1910.

Application filed June 21, 1902. Serial No. 112,621.

*To all whom it may concern:*

Be it known that I, JOSEPH DAIN, a citizen of the United States, residing at Ottumwa, in the county of Wapello and State of Iowa, have invented certain new and useful Improvements in Hay-Loaders, of which the following is a specification, reference being had to the accompanying drawings.

My invention relates to hay loaders, and has for its object to provide certain improvements in hay loaders of the type set forth in Patent No. 681,778, granted to me September 3, 1901. In the machine of my said patent I provide for operating the rake-bars by means of a crank-shaft carried below the elevator frame, and support the pitmen or levers, by which the rake-bars are operated, upon traveling fulcra, thereby giving to the rake-bars the proper raking movement. In my present invention, in a broad sense, I employ the same features, but in a form more improved than that set forth in my said patent. According to my latest improved construction, the pitmen are suspended by swinging links from a suitable support, said links forming traveling fulcra for the operating levers or pitmen, securing the proper movement of the rake-bars; but the construction is, however, simpler and more efficient than that set forth in my former patent.

A further improvement consists in means for vertically adjusting the rake frames to regulate their paths with respect to the elevator frame, the adjustment being secured from above, instead of from below, as in my former patent.

A still further improvement consists in so mounting the rake frames that they may yield vertically under pressure, so that, when necessary to avoid breakage, they may ride over the hay being carried up on the elevator frame, or over other obstacles.

With regard to the mechanism for driving the rake frames from the wheels, my present invention involves a construction by which sprocket wheels are provided at both sides of the loader and both of said sprocket wheels are driven by each of the carrying wheels, thereby preventing torsional strain on the sprocket-wheel shaft and securing the rotation in unison of both sprocket wheels.

A further improvement consists in placing the two sprocket wheels adjacent to the cranks by which the rake frames are operated, making it possible to use a lighter sprocket-wheel shaft, as well as applying the power to the sprocket wheels more nearly in line with the cranks.

A still further improvement consists in providing means for adjusting the carrying-wheel axle toward and from the elevator frame, and also in securing such adjustment without affecting the tension of the drive chains.

Other improvements relate to the mechanism for adjusting the angular position of the extension frame, and to certain improvements in details of construction which will be hereinafter set forth.

That which I regard as new will be set forth in the claims.

Figure 2:
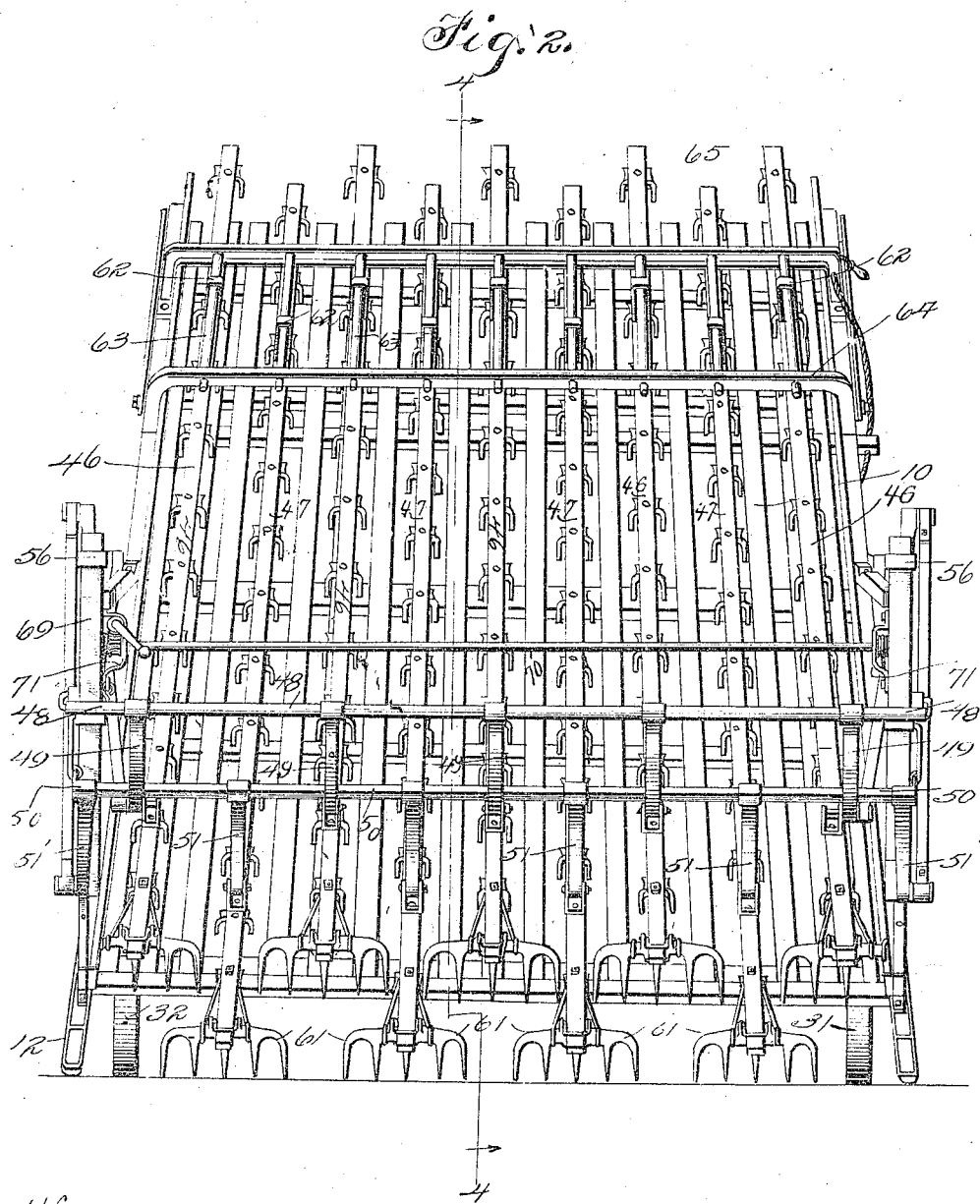
Figure 3:
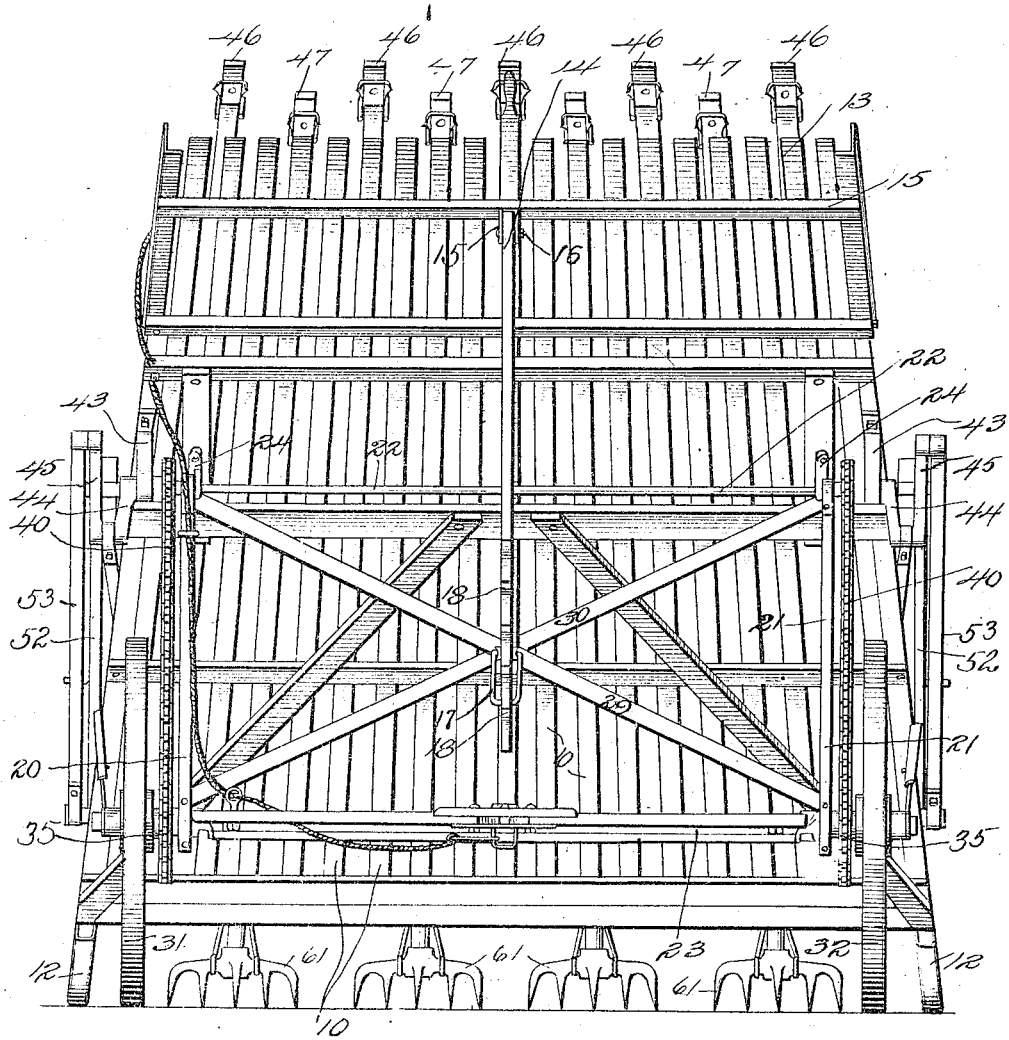
Figure 4:
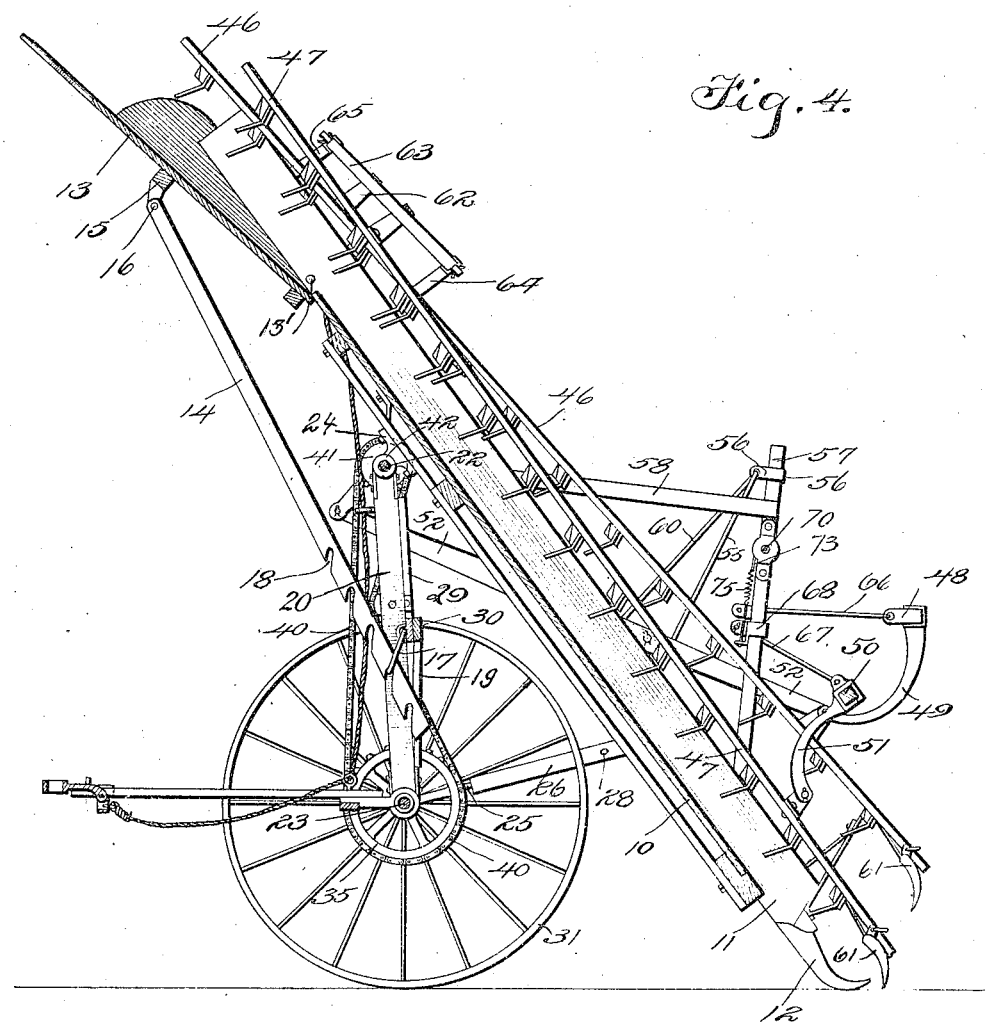

In the accompanying drawings, Figure 1 is a side elevation; Fig. 2 is a rear elevation;
Fig. 3 is a front elevation; Fig. 4 is a vertical section on line 4—4 of Fig. 2; Fig. 5 is an enlarged detail, illustrating the pitmen or operating levers and their connections; Fig. 6 is a perspective view, illustrating the devices for adjusting the rake frames, with their operating mechanism, vertically; Fig. 7 is a detail, illustrating the drive chain and the mechanism for operating it; Fig. 8 is a section on line 8—8 of Fig. 7; and Fig. 9 is a perspective view, illustrating the lower end of one of the rake-bars.

Referring to the drawings, 10 indicates the elevator frame, which is similar in construction to that set forth in my former patent above referred to, and is of such shape and construction as to be adapted to support the hay as it is being carried up by the rake frames. The side bars 11 of the elevator frame extend down to the ground, as shown in Fig. 1, and are provided with shoes 12 adapted to run on the groun . At its upper end the elevator frame is provided with a hinged extension-frame 13 pivoted at 13′ to the side bars 11, as shown in Fig. 4, and adapted to be adjusted to a greater or less angle with the elevator frame. The extension frame 13 is supported in its different positions of adjustment by a central supporting-bar 14 which is pivotally connected at its upper end, preferably by a yoke 15 and pivot 16, to the central portion of the extension frame, and at its lower end is supported in a swinging yoke 17 which engages notches 18 in the under side of said bar 14, so that said bar may be supported in different positions of adjustment. The yoke 17 is carried in a wheel frame, which also supports the elevator frame, as shown in Fig. 4.

The construction of the wheel frame is best shown in Figs. 3 and 4, from an inspection of which it will be seen that it consists of end bars 20—21 connected at the top by a shaft 22 and at the bottom by an axle 23. Both the shaft 22 and axle 23 are rotatably secured in the end bars, suitable bearings being provided for that purpose. The elevator frame is pivotally connected to the shaft 22 by brackets 24 near its ends, and is adjustably connected to the ends of the axle 23 by adjustable bars 25—26 at each side, as best shown in Fig. 1. The bars 25 are secured upon the ends of the axle 23, upon which they fit; while the bars 26 are secured to the side bars 11 of the elevator frame at 27, as shown in Fig. 1. The bars 25—26 are secured together by providing the bars 26 with adjusting holes 28 and passing the end of the bar 25 through one of such holes, as shown in Fig. 1, where it may be secured by a cotter pin or other suitable device. By adjusting the position of the bars 25 on the bars 26, the axle 23 may be moved nearer to or farther from the lower portion of the elevator frame, consequently adjusting the angular position of the elevator frame with reference to the wheel frame. 29—30 indicate braces which connect the side bars 20—21 of the wheel frame, as shown in Fig. 3. 31—32 indicate carrying wheels, which, as shown, are mounted on the ends of the axle 23. As will appear from the foregoing description, the elevator frame is carried by the wheel frame, and, as shown in Figs. 1 and 4, it occupies an inclined position, the shoes 12 resting on the ground.

The adjustment of the angular position of the elevator frame with reference to the wheel frame provided for by the construction above described, enables the operator to adjust the machine so that a greater or less part of the weight rests upon the shoes 12 at the lower end of the elevator frame. In loading windrows of very heavy hay the lower portion of the elevator frame is moved back or away from the wheel frame to throw the weight back from over the wheel frame so that the hay at the upper part of the elevator frame does not tend to tip it up. This is an important advantage of my improved construction.

The wheels 31—32 are loosely mounted on the ends of the axle 23, but are adapted to be connected to said axle by clutch mechanism, so that they operate to rotate it when the loader moves in a forward direction. The clutch mechanism employed is shown in Figs. 7 and 8. Such clutch mechanism consists of a cylinder or sleeve 33 having a notched inner surface, as shown in Fig. 7, one of which sleeves is carried at the inner end of each wheel hub, preferably being formed integral with the wheel hub. Each of said sleeves is adapted to be engaged by a dog 34 carried by a sprocket wheel 35, one of which is mounted upon and keyed to the axle 23, near each end thereof, as shown in Fig. 8. The dog 34 is mounted upon a pivot 36, carried by the sprocket wheel near the center thereof, and is adapted to engage the notches of the sleeve 33 when in its normal position, it being held normally in operative position by a spring 37, as shown in Fig. 7. The construction is such that when the sleeve 33 rotates in the direction indicated by the arrow in Fig. 7, its engagement with the dog 34 will effect the rotation of the sprocket wheel 35 in the same direction. The sleeve 33 is, however, free to rotate in the opposite direction without rotating the sprocket wheel 35.

38 indicates a link pivoted to the sprocket wheel 35 near the periphery thereof, and connected by a link 39 with the outer end of the dog 34. Said link serves to guide the dog 34 and hold it properly in position. Both wheels 31—32 are provided with the sleeves 33, and act to drive the sprocket wheels 35, arranged as above described. The result is that whichever carrying wheel is rotated in a forward direction operates to rotate the axle 23, consequently positively rotating both sprocket wheels in the direction indicated by the arrow in Fig. 7. The sprocket wheels 35 are connected by chains 40 to sprocket wheels 41 mounted on the ends of the shaft 22 and secured thereto by set screws 42, or other suitable means, so that the rotation of the axle 23, effected by either or both carrying wheels, is communicated positively to both sprocket wheels 41. No torsional strain is therefore experienced by the shaft 22, making it possible to use a lighter shaft without interfering with the strength and efficiency of the machine.

43 indicates brackets secured to the under sides of the side bars 11 and supporting the end portions of the shaft 22, as shown in Fig. 3. As shown in Figs. 3 and 5, each end of the shaft 22 is provided with double cranks 44—45 for operating the rake frames. Two rake frames are provided, each consisting of a series of rake bars carrying at their lower ends rakes, the rake bars of each rake frame being connected together to operate in unison. The rake bars of the different rake frames are arranged alternately, and the different rake frames, being operated by different cranks, move oppositely. Consequently, as one rake frame moves up the other moves down, in the well-known way.

Referring to Fig. 2, 46 indicates the rake bars composing one of the rake frames, and 47 the rake bars of the other rake frame. As shown, the rake bars 46 are connected together by a transverse rod 48, by means of connecting arms 49 connected to said bar 48 and to the different rake bars. Similarly, the rake bars 47 are connected together by a bar 50 and arms 51, as best shown in Figs. 2 and 4. 52 indicates operating levers or pitmen, the rear ends of which are connected with the series of rake-bars 46, the forward ends of said pitmen being connected with the cranks 44. 53 indicates operating levers or pitmen, the forward ends of which are connected with the cranks 45, their rear ends being connected with the series of rake-bars 47. By this construction the driving power is applied to each rake through the bars 48 or 50, as the case may be, and is not transmitted through the rake bars.

The pitmen 53 are fulcrumed upon pivots 54 carried at the lower ends of swinging arms 55, which at their upper ends are pivoted in sliding boxes 56 mounted on standards 57 placed at opposite sides of the machine and secured to the side bars 11 of the elevator frame, as shown in Fig. 1, 2 and 5. The standards 57 are braced so as to maintain rigidly their upright position, by braces 58 secured to them near their upper ends and also to the side bars 11 of the elevator frame. To further brace the standards 57, the rear ends of the bars 26 are extended and secured to said standards, as shown in Fig. 1. Similarly, the pitmen 52 are fulcrumed on pivots 59 at the lower ends of swinging arms 60, also carried by the boxes 56. The lower ends of the arms 55—60 are bent at right angles and pass through suitable holes or bearings in the pitmen, being secured in place by split keys, as shown in Fig. 1, so that the pitmen are pivotally supported upon the lower ends of said arms. This construction may, however, be varied if desired.

By the construction described, when the cranks 44—45 are rotated, the operating levers or pitmen 52—53 will be caused to swing backward and forward on the arms 55—60, and at the same time said pitmen will be rocked upon their pivots 54—59, thereby carrying the rake frames alternately up over the elevator frame and in close proximity thereto and afterward moving them out away from said elevator frame and downward to the ground. The adjustment of the parts is such that the reach the ground at a short distance from the lower end of the elevator frame and are then moved toward the elevator frame, raking the hay toward it and then carrying it up as they move up over the elevator frame.

The rake heads employed are best shown in Fig. 9, in which 61 indicates one of the rake heads. The rake head shown forms the subject-matter of a separate patent, No. 676,304, granted to me June 11, 1901, and forms no part of my present invention. I wish it to be understood, further, that my invention is not restricted to the use of such rake head, as other suitable forms may be employed.

The upper ends of the rake frames are guided by clips 62, one of which is provided on the upper surface of each rake bar near its upper end, and embraces a guide rod 63, a number of which are provided near the upper end of the elevator frame, a guide bar 63 being provided for each rake bar. The guide bars 63 are arranged substantially parallel with the upper portions of the rake bars and lie over and a short distance from them, so that the clips 62 may travel from end to end of said guide bars. The ends of the guide bars are supported by means of braces 64—65 at their lower and upper ends, as shown in Figs. 1 and 2. The lower portions of the rake frames are further guided and prevented from becoming displaced by links 66—67 connecting the bars 48—50, respectively, with sliding boxes 68 mounted on the standards 57, as best shown in Fig. 1. The sliding boxes 68 are similar to the boxes 56 and lie below them on the standards 57, as shown. They are connected by connecting straps 69, also shown in Fig. 1 and in Figs. 5 and 6. By thus connecting the boxes 56 and 68, they may be adjusted vertically simultaneously and without varying their relative position. The vertical adjustment of the boxes 56—68 at both sides of the machine is secured simultaneously by means of a shaft 70, which extends across the machine over the rake frames and at a sufficient distance from them to avoid interfering with their proper operation. (See Fig. 5.) The ends of the shaft 70 are supported in suitable bearings in brackets 71 secured to the inner sides of the standards 57, and carry pulleys 72 upon which are adapted to be wound cords 73, the lower ends of which are connected to arms 74 carried by the boxes 68. A spring section 75 is provided in each chain or other flexible connection 73, so that the boxes 56—68 are yieldingly supported from said pulleys 72. By winding the chains 73 upon the pulleys 72, the boxes 56—68, with the suspending arms 55—60, may be raised to adjust the paths in which the rakes are moved. For the purpose of rotating the shaft 70 to secure this adjustment, said shaft is provided at one end with a worm wheel 76 which meshes with a worm 77 mounted on one of the standards 57, as shown in Fig. 5, and provided with a crank 78 by which it may be rotated. The operator may thus readily secure any desired adjustment of the boxes 56—68, with a corresponding adjustment of the operating levers 52—53 and rake frames.

The operation is as follows: When either of the carrying wheels rotates in a forward direction, the axle 23 is rotated, positively driving both chains 40 and both sprocket wheels 41. The shaft 22 is thereby rotated, rotating the double cranks 44—45 at each side of the machine, consequently reciprocating and rocking the pitmen 52—53, thereby operating the rake frames to carry up the hay on the elevator frame. As the rake frames operate, they are guided and supported by the links 66—67, connected to the bars 48—50, respective, and to the boxes 68 at the sides of the machine. If it be desired to adjust the angular position of the elevator frame or throw more weight forward or back of the main wheels, this may be accomplished by adjusting the connecting bars 25—27, thereby moving the wheels toward or from the lower part of the elevator frame, which rocks upon the shaft 22. If it be desired to adjust the paths of the rakes, the crank 78 is rotated in one direction or the other and the adjustment effected in the manner already described.

During the operation of the rakes it sometimes happens that it is necessary for the rake frames to pass over some obstacle, and by my improved construction this is provided for, since by suspending the rake frames by means of the flexible connections 73 they are free to rise as much as may be necessary, as they are held in operative position only by gravity.

It should be understood that, while I have described my improvements specifically as illustrated, my invention is not restricted to such specific features, except in so far as they are particularly claimed.

That which I claim as my invention and desire to secure by Letters Patent is,—

1. In a hay-loader, the combination of an elevator-frame, raking-devices above said elevator-frame, reciprocating rocking-levers for operating said raking-devices, and swinging means supporting said levers from above.

2. In a hay-loader, the combination of an elevator-frame, raking-devices above said elevator-frame, reciprocating rocking-levers for operating said raking-devices, and swinging means yieldingly supporting said levers from above.
3. In a hay-loader, the combination of a machine frame including an elevator frame, raking devices, and mechanism for operating said raking devices and yieldingly supporting them over the elevator frame in-
cluding one or more reciprocating rocking levers fulcrumed on the machine frame.

4. In a hay-loader, the combination of a machine frame including an elevator frame, and standards carried by said elevator frame, raking devices and means including one or more reciprocating rocking levers fulcrumed on the machine frame for operating said raking devices, and yieldingly suspending them from said standards.

5. In a hay-loader, the combination of an elevator-frame, raking-devices, means including reciprocating rocking levers for operating said raking-devices and yieldingly supporting them over the elevator frame, and means below the elevator-frame for actuating said levers, substantially as described.

6. In a hay-loader, the combination of an elevator frame, standards carried by and projecting above said elevator frame, raking devices and means including one or more reciprocating rocking levers for operating said raking devices, and pivotally suspending them from said standards.

7. In a hay-loader, the combination of an elevator frame, standards carried by and projecting above said elevator frame, raking devices, means including one or more reciprocating rocking levers for operating said raking devices and suspending them from said standards, and means for adjusting said raking devices to vary the paths traversed thereby.

8. In a hay-loader, the combination of an elevator frame, raking devices, means including reciprocating rocking levers fulcrumed on parts other than the raking devices for operating said raking devices and flexibly suspending them over said elevator frame, and means for adjusting the raking devices toward and from the elevator frame.

9. In a hay-loader, the combination of an elevator frame, standards carried thereby and projecting thereabove, raking devices, means including reciprocating rocking levers fulcrumed on parts other than the raking devices for operating said raking devices and suspending them from said standards over the elevator frame, and mechanism for vertically adjusting the suspending means to move the raking devices toward and from the elevator frame.

10. In a hay-loader, the combination of an elevator frame, fixed standards rising therefrom, a shaft supported by said standards, pulleys carried by said shaft, flexible connections running on said pulleys, raking devices suspended from said flexible connections, means for rotating said shaft, and one or more reciprocating rocking levers for operating said raking devices.

11. In a hay-loader, the combination of an elevator frame, standards rising therefrom, a shaft mounted in said standards, pulleys carried by said shaft, flexible connections passing over said pulleys, raking devices suspended by said connections from said pulleys, a crank for rotating said shaft, gearing connecting said crank with said shaft, and means for operating said raking devices, substantially as described.

12. In a hay-loader, the combination of an elevator frame, raking devices, reciprocating rocking levers for operating said raking devices, means for operating said levers and means suspending said levers from above said elevator frame, substantially as described.

13. In a hay-loader, the combination of an elevator frame, raking devices adapted to be reciprocated over said frame, reciprocating rocking levers connected with said raking devices, means for reciprocating and rocking said levers, and swinging suspending devices pivotally mounted above said elevator frame, upon which said levers are fulcrumed, substantially as described.

14. In a hay-loader, the combination of an elevator frame, raking devices adapted to be reciprocated over said frame, a crank driving-shaft, levers connected at one end to said shaft and at the other end to said raking devices, and swinging supports upon the lower portions of which said levers are fulcrumed, substantially as described.

15. In a hay-loader, the combination of an elevator frame, raking devices, reciprocating rocking levers for operating said raking devices, swinging suspending devices upon the lower portions of which said levers are fulcrumed, and means for vertically adjusting said suspending devices, substantially as described.

16. In a hay-loader, the combination of an elevator frame, raking devices, reciprocating rocking levers for operating said raking devices, swinging suspending devices upon the lower portions of which said levers are fulcrumed, and means yieldingly supporting said suspending devices, substantially as described.

17. In a hay-loader, the combination of an elevator frame, raking devices, reciprocating rocking levers for operating said raking devices, swinging suspending devices upon the lower portions of which said levers are fulcrumed, and spring mechanism yieldingly supporting said suspending devices, substantially as described.

18. In a hay-loader, the combination of an elevator frame, raking devices, reciprocating rocking levers for operating said raking devices, swinging suspending devices upon the lower portions of which said levers are fulcrumed, means supporting said suspending devices, and means for vertically adjusting said suspending devices, substantially as described.

19. In a hay-loader, the combination of an elevator frame, standards rising therefrom, swinging arms pivotally supported by said standards, reciprocating rocking levers suspended by and fulcrumed upon said arms, and rake frames operated by said levers, substantially as described.

20. In a hay-loader, the combination of an elevator frame, standards rising therefrom, swinging arms pivotally supported by said standards, reciprocating rocking levers suspended by and fulcrumed upon said arms, rake frames operated by said levers, and means for vertically adjusting said arms, substantially as described.

21. In a hay-loader, the combination of an elevator frame, rake bars adapted to reciprocate thereover, standards rising from said elevator frame, swinging connecting devices connecting the lower portions of said rake bars with said standards, and means for operating said rake bars, substantially as described.

22. In a hay-loader, the combination of an elevator frame, rake bars adapted to reciprocate thereover, standards rising from said elevator frame, boxes mounted on said standards, links connecting said boxes with said rake bars, means for vertically adjusting said boxes, and means for operating said rake bars, substantially as described.

23. In a hay-loader, the combination of an elevator frame, rake bars adapted to be reciprocated thereover, transverse bars connecting said rake bars, forming rake frames, standards carried by said elevator frame, boxes mounted on said standards, links connecting said transverse bars with said boxes, means for vertically adjusting said boxes, and means for operating said rake bars, substantially as described.

24. In a hay-loader, the combination of an elevator frame, rake bars adapted to be reciprocated thereover, standards rising from said elevator frame, sliding boxes mounted on said standards, links connecting said boxes with said rake bars, suspending devices connected to said boxes, reciprocating rocking levers fulcrumed on said suspending devices, and means for operating said levers, substantially as described.

25. In a hay-loader, the combination of an elevator frame, rake bars adapted to be reciprocated thereover, standards rising from said elevator frame, sliding boxes mounted on said standards, links connecting said boxes with said rake bars, suspending devices connected to said boxes, reciprocating rocking levers fulcrumed on said suspending devices, means for operating said levers, and means for vertically adjusting said boxes, substantially as described.

26. In a hay-loader, the combination of an elevator frame, rake bars adapted to be reciprocated thereover, standards rising from said elevator frame, sliding boxes mounted on said standards, links connecting said boxes with said rake bars, suspending devices connected to said boxes, reciprocating rocking levers fulcrumed on said suspending devices, means for operating said levers, and means yieldingly supporting said boxes on said standards, substantially as described.

27. In a hay-loader, the combination of an elevator frame, rake bars adapted to be reciprocated thereover, standards rising from said elevator frame, sliding boxes mounted on said standards, links connecting said boxes with said rake bars, suspending devices connected to said boxes, reciprocating rocking levers fulcrumed on said suspending devices, and means for simultaneously vertically adjusting the boxes on said standards, substantially as described.

28. In a hay-loader, the combination of a wheel frame, an inclined elevator frame which bears at its lower end on the ground and the upper end portion of which extends over the wheel frame and is pivotally supported thereby at a distance from the wheel axles, means adjustably connecting the lower end portion of said elevator frame with the wheel frame whereby the inclination of said elevator frame may be varied, raking devices, and means carried by the wheel frame for operating said raking devices.

29. In a hay-loader, the combination of a wheel frame, an elevator frame pivotally connected therewith, adjustable connecting-bars connecting the lower portion of said elevator frame with the lower portion of the wheel frame, raking devices, and means carried by the wheel frame for operating said raking devices.

30. In a hay-loader, the combination of a wheel-frame, an elevator-frame pivotally mounted on said wheel-frame at a distance from the wheel-axles, an extension-frame pivotally connected with said elevator-frame, a bar connected with said extension-frame, and means adjustably connecting said bar with said wheel-frame, substantially as described.

31. In a hay-loader, the combination of an elevator frame, an extension frame pivotally connected therewith, a bar 14 connected to said extension frame, a wheel frame, and a swinging yoke carried by said wheel frame, said bar having notches in its under surface adapted to receive said yoke for adjusting the position of said bar and said extension frame, substantially as described.

32. In a hay-loader, the combination of a wheel frame having carrying wheels, an inclined elevator frame bearing at its lower end on the ground and extending over said wheel frame and pivotally supported thereby at a distance from the wheel axles, raking devices carried by said elevator frame, driving devices carried by said wheel frame at each side of the machine, and means for positively operating both of said driving devices by the rotation of either of the carrying wheels.

33. In a hay-loader, the combination of a wheel frame having carrying wheels, an axle on which said carrying wheels are mounted, sprocket wheels mounted on said axle near the ends thereof and keyed thereto, means operated by the forward rotation of either of the carrying wheels for rotating said axle, a shaft supported on said wheel frame, double cranks at the ends of said shaft, pinions mounted near the ends of said shaft, drive chains connecting said sprocket wheels and said pinions, an elevator frame pivotally supported by said wheel frame at a distance from the wheel axles, raking devices on said elevator frame, and means connected with said cranks for operating said raking devices.

34. In a hay-loader, the combination with an elevator-frame, raking-devices adapted to be reciprocated over said frame, reciprocating rocking members connected with said raking-devices, means for reciprocating and rocking said members, and swinging suspending-devices supporting said members from above, substantially as described.

35. In a hay-loader, the combination of an elevator frame, raking devices above said elevator frame, and means including reciprocating rocking levers fulcrumed on parts other than the raking devices for operating said raking devices, and yieldingly suspending the lower portions thereof so that they are free to move away from the elevator frame.

36. In a hay-loader, the combination of an elevator frame, raking devices above said elevator frame, reciprocating rocking levers fulcrumed on parts other than said raking devices, the lower portions of said raking devices being flexibly suspended over the elevator frame.

37. In a hay-loader, the combination of an elevator frame, raking devices, means including reciprocating rocking levers for operating said raking devices and yieldingly supporting them over the elevator frame independently of the driving mechanism, supporting means on which said levers are fulcrumed, and driving mechanism for operating said levers.

38. In a hay-loader, the combination of an elevator frame, raking devices, standards carried by said elevator frame, means including reciprocating rocking levers for operating said raking devices and yieldingly suspending them from said standards, supporting means on which said levers are fulcrumed, and driving mechanism for operating said levers.

39. In a hay-loader, the combination of a wheel frame having carrying wheels, an axle on which said carrying wheels are mounted, sprocket wheels mounted on said axle near the ends thereof and keyed thereto, means operated by the forward rotation of either of the carrying wheels for rotating said axle, a shaft supported on said wheel frame, double cranks at the ends of said shaft, pinions mounted near the ends of said shaft, drive chains connecting said sprocket wheels and said pinions, an elevator frame pivotally supported by the wheel frame at a distance from the wheel axles, raking devices mounted on said elevator frame, and levers connected with said cranks near the rear portion of said raking devices for operating the same.

40. A hay-loader, comprising an elevator-frame, raking-devices, one or more reciprocating-levers for operating said raking-devices, depending-means above the elevator-frame on which said lever or levers are fulcrumed, and means for actuating said lever or levers.

41. A hay-loader, comprising an elevator-frame, raking-devices, one or more reciprocating-levers for operating said raking-devices, depending-means above the elevator-frame on which said lever or levers are fulcrumed, means for actuating said lever or levers, and means for varying the paths traversed by the raking-devices.

42. In a hay-loader, the combination of a wheel frame, an elevator frame pivotally supported thereby and bearing at its lower end on the ground, means supporting the pivot of the elevator frame eccentrically to and parallel with the wheel axes, raking devices, and means for operating said raking devices by the forward movement of the machine.

43. In a hay-loader, the combination of an elevator frame, raking devices, yielding supporting devices for supporting said raking devices over the elevator frame, and reciprocating rocking lever mechanism fulcrumed independently of the raking devices for operating said raking devices.

44. In a hay-loader, the combination of an elevator-frame, raking-devices, swinging fulcra suspended from suitable supporting means, and actuating levers for said raking-devices supported by said fulcra.

45. In a hay-loader, the combination of an elevator-frame, raking-devices, swinging fulcra suspended from suitable supporting means, levers carried by said fulcra and connected with said raking-devices, and means for reciprocating and rocking said levers.

46. In a hay-loader, the combination of an elevator frame, raking devices and means including one or more reciprocating rocking levers fulcrumed on parts other than the raking devices for operating said raking devices and yieldingly supporting them over the elevator frame.

47. In a hay-loader, the combination of an elevator frame, raking devices above said elevator frame, levers for operating said raking devices, and means supporting said levers from above.

48. In a hay-loader, the combination of an elevator frame, a plurality of series of raking devices, separate means connecting the raking devices in each series together, and mechanism acting through said connecting means for operating said raking devices and yieldingly suspending them over the elevator frame.

49. In a hay-loader, the combination of an elevator frame, a plurality of series of raking devices above said elevator frame, separate means connecting the raking devices of each series together, means including actuating mechanism operating through said connecting means for operating said raking devices and suspending them over the elevator frame, and means connected with said connecting devices for guiding said raking devices.

50. In a hay-loader, the combination of an elevator frame, a plurality of series of rake bars each having an upwardly-projecting arm, separate means connecting the upwardly-projecting arms in each series of rake bars, and means including driving devices connected with said connecting means and yieldingly suspending the rake bars over the elevator frame.

51. In a hay-loader, the combination of an elevator frame, raking devices adapted to be reciprocated over said elevator frame, a crank driving shaft located below the elevator frame, levers connected at one end with the cranks on said shaft and at the other end with said raking devices, and swinging supports upon the lower portions of which said levers are fulcrumed.

52. In a hay-loader, the combination of an elevator frame, raking devices above said elevator frame, and means including reciprocating rocking levers fulcrumed on parts other than the raking devices for operating said raking devices, and supporting them so that they are free to move away from the elevator frame.

53. In a hay-loader, the combination of an elevator frame, raking devices above said elevator frame, means including reciprocating rocking levers fulcrumed on parts other than the raking devices for operating said raking devices and supporting them over the elevator frame, and means for adjusting the raking devices toward and from the elevator frame.

54. In a hay-loader, the combination of raking devices, and an elevator frame having means including one or more reciprocating rocking levers for operating said raking devices and yieldingly supporting them over the elevator frame.

55. In a hay-loader, the combination of raking devices, and an elevator frame having means including one or more reciprocating rocking levers fulcrumed on the machine frame for operating said raking devices and yieldingly supporting them over the elevator frame.

JOSEPH DAIN.

Witnesses:
JULIA M. BRISTOL,
HELEN M. COLLIN.